United States Patent
Chae

(10) Patent No.: US 10,867,378 B2
(45) Date of Patent: Dec. 15, 2020

(54) IMAGE PROCESSING DEVICE, IMAGE PROCESSING METHOD, SERVER, AND COMPUTER PROGRAM

(71) Applicant: RAKUTEN, INC., Tokyo (JP)

(72) Inventor: Yeongnam Chae, Tokyo (JP)

(73) Assignee: Rakuten, Inc., Tokyo (JP)

( * ) Notice: Subject to any disclaimer, the term of this patent is extended or adjusted under 35 U.S.C. 154(b) by 68 days.

(21) Appl. No.: 16/348,541

(22) PCT Filed: Nov. 30, 2016

(86) PCT No.: PCT/JP2016/085611
§ 371 (c)(1),
(2) Date: May 9, 2019

(87) PCT Pub. No.: WO2018/100694
PCT Pub. Date: Jun. 7, 2018

(65) Prior Publication Data
US 2019/0279352 A1    Sep. 12, 2019

(51) Int. Cl.
*G06K 9/00*    (2006.01)
*G06T 7/00*    (2017.01)
(Continued)

(52) U.S. Cl.
CPC ............ *G06T 7/0002* (2013.01); *G06F 16/00* (2019.01); *G06K 9/4642* (2013.01); *G06Q 30/00* (2013.01); *G06T 3/608* (2013.01); *G06T 7/00* (2013.01); *H04N 1/6008* (2013.01); *G06T 2207/10024* (2013.01); *G06T 2207/20224* (2013.01)

(58) Field of Classification Search
CPC .................................................. G06T 7/0002
See application file for complete search history.

(56) References Cited

U.S. PATENT DOCUMENTS 5,412,578 A    5/1995   Takagi et al.
9,691,161 B1 *  6/2017   Yalniz .................. G06K 9/2027
(Continued)

FOREIGN PATENT DOCUMENTS

| JP | 6-221831 A | 8/1994 |
| JP | 2014-67174 A | 4/2014 |
| JP | 2016-171499 A | 9/2016 |

OTHER PUBLICATIONS

Philbin et al (NPL "Object Retreval with large vocabularies and fast spatial matching", IEEE, 2007, p. 8). (Year: 2007).*
(Continued)

*Primary Examiner* — Oneal R Mistry
(74) *Attorney, Agent, or Firm* — Sughrue Mion, PLLC

(57) ABSTRACT

An image processing device acquires an image to be processed that includes an image of clothing, the image being composed of a hue, saturation and brightness; calculates a difference between the image to be processed and a plurality of shift images obtained by shifting the image to be processed in units of one pixel by at least one pixel or more in a prescribed direction, and generates a plurality of difference images that correspond to the number of shifted pixels; generates a histogram of differential pixel values for each of the hue, saturation and brightness of the difference images; determines the fabric of the clothing on the basis of the features of the histogram.

14 Claims, 7 Drawing Sheets

(51) Int. Cl.
*G06K 9/46* (2006.01)
*G06T 3/60* (2006.01)
*H04N 1/60* (2006.01)
*G06Q 30/00* (2012.01)
*G06F 16/00* (2019.01)

(56) References Cited

U.S. PATENT DOCUMENTS

| | | | |
|---|---|---|---|
| 10,083,521 B1* | 9/2018 | Dhua | G06Q 30/0603 |
| 2016/0065903 A1* | 3/2016 | Wang | B60R 11/04 |
| | | | 348/148 |

OTHER PUBLICATIONS

International Search Report for PCT/JP2016/085611 dated Dec. 27, 2016 (PCT/ISA/210).

* cited by examiner

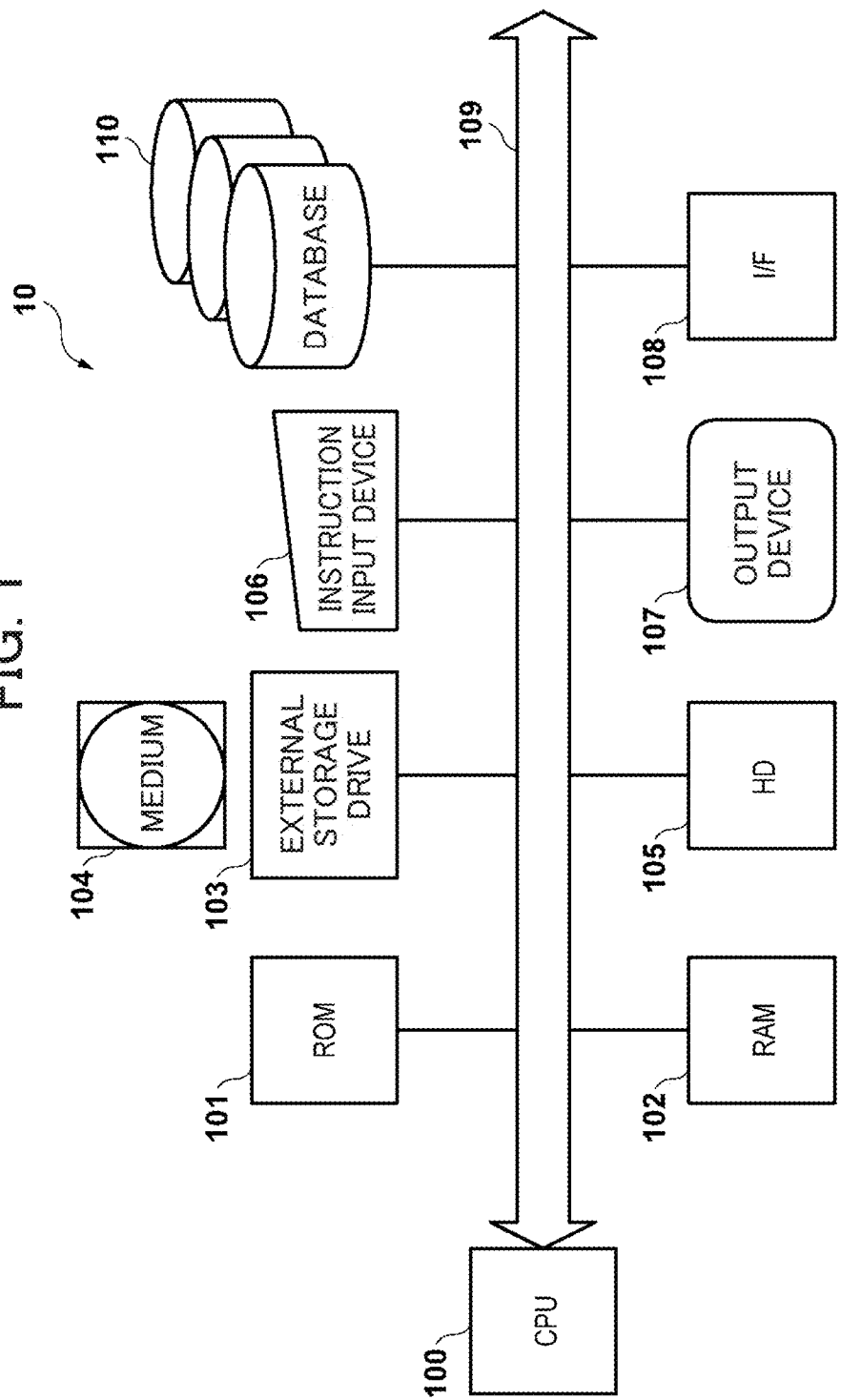

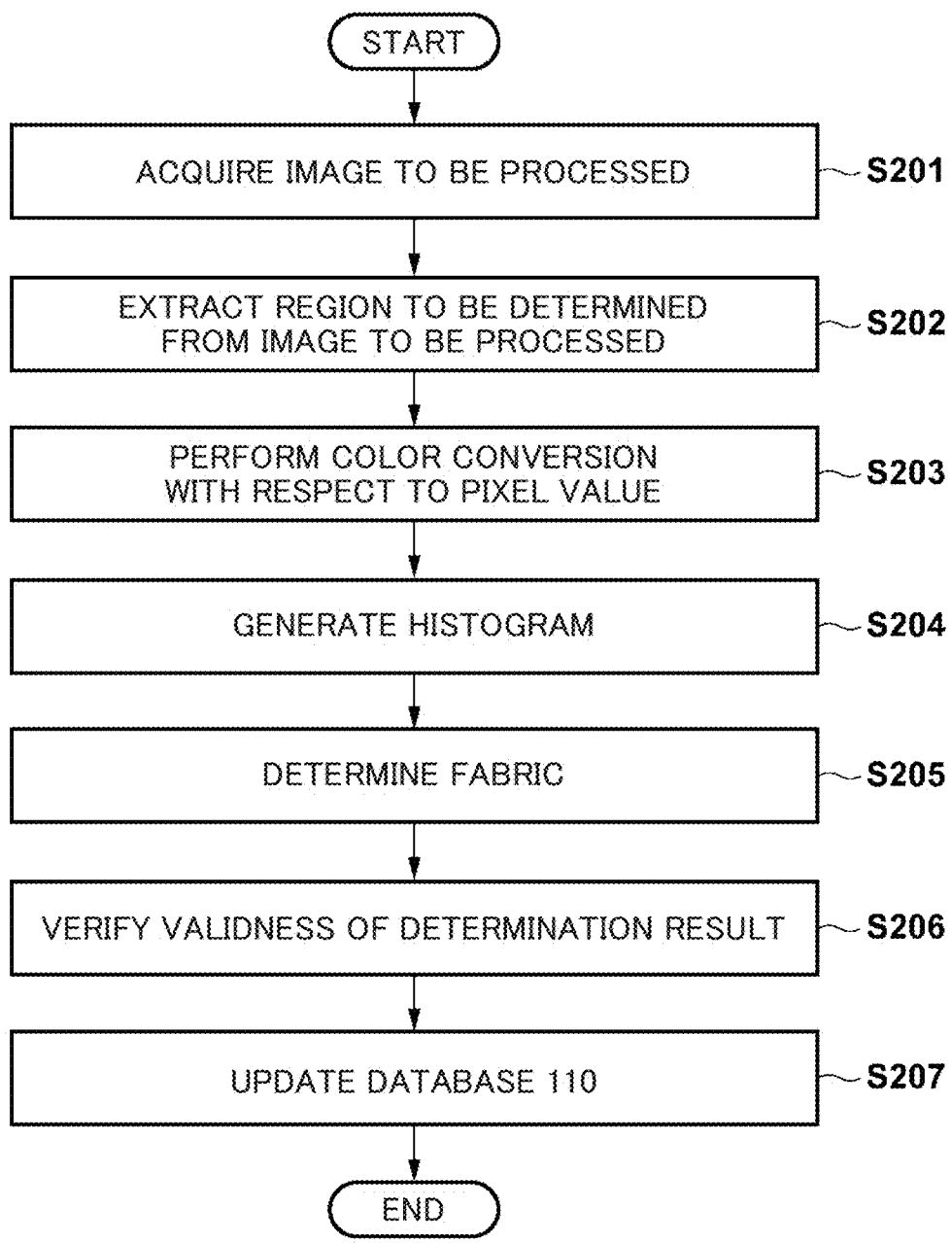

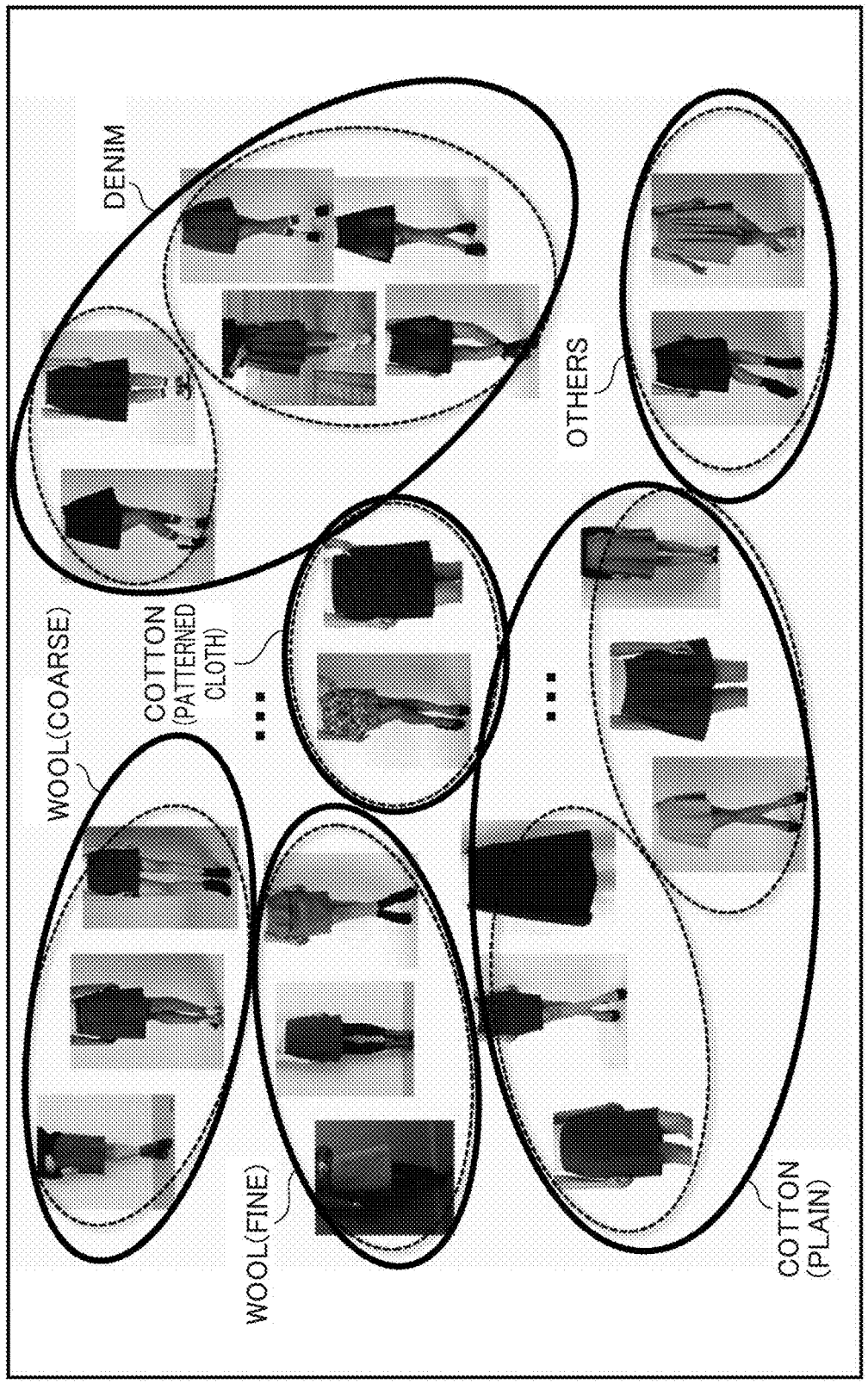

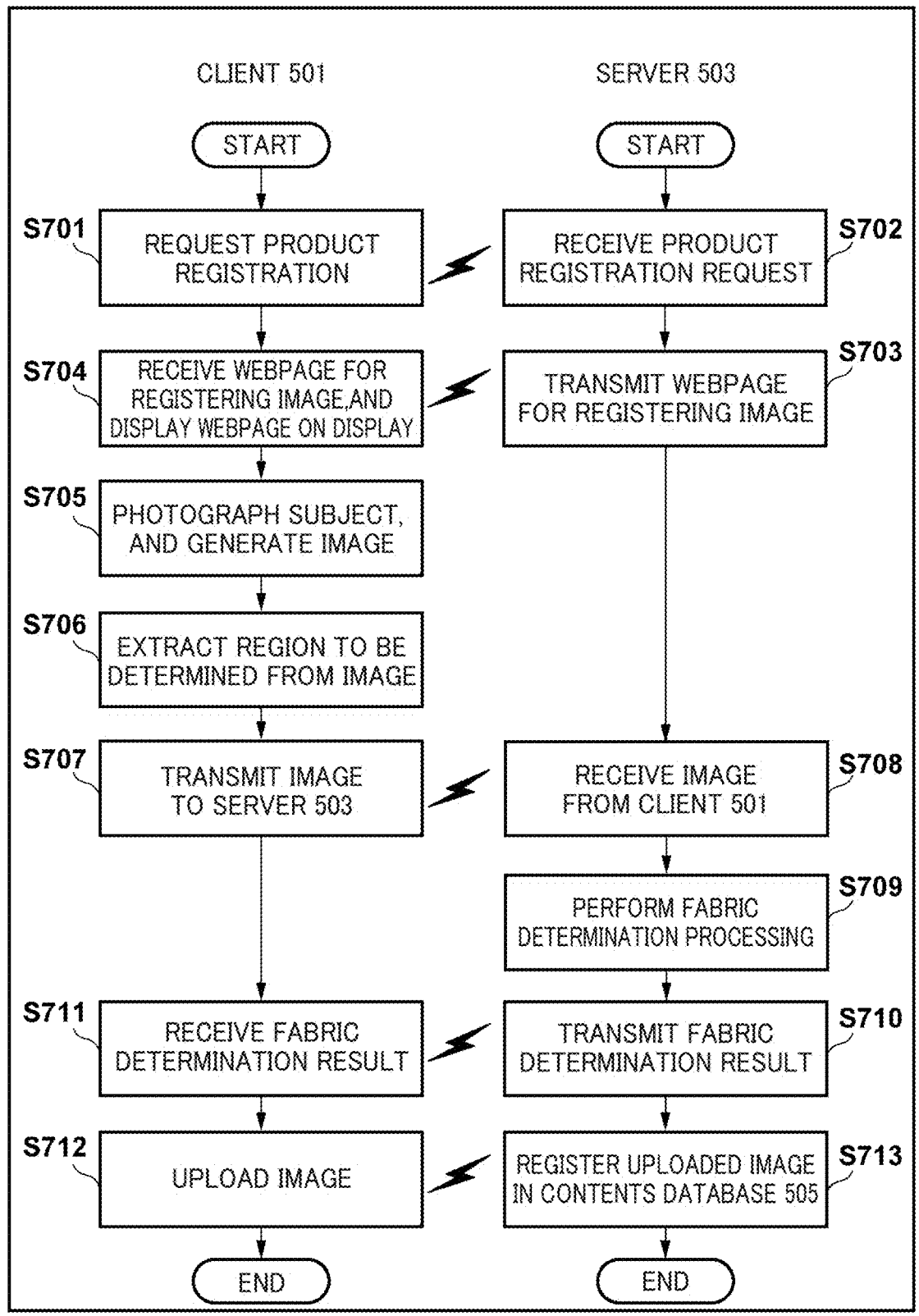

IMAGE PROCESSING DEVICE, IMAGE PROCESSING METHOD, SERVER, AND COMPUTER PROGRAM

CROSS REFERENCE TO RELATED APPLICATIONS

This application is a National Stage of International Application No. PCT/JP2016/085611 filed Nov. 30, 2016.

TECHNICAL FIELD

The present invention relates to an image processing device, an image processing method, a server, and a computer program.

BACKGROUND ART

Attribution information such as generation date and time, a location, and a camera parameter, is generally added to an image. At this time, subject information is added by being extracted according to image processing (refer to Patent Document 1).

Patent Document 1: Japanese Unexamined Patent Application, Publication No. 2016-171499

DISCLOSURE OF THE INVENTION

Problems to be Solved by the Invention

However, a technology of specifying a fabric of clothing included in the image, and of associating the specified fabric with the image, has not been provided.

Regarding this point, in an online shopping site handling clothing as a product, product information is essential along with a product image, but the number of products to be handled, is enormous, and there is a limitation on inputting accurate information with respect to all of the products. In particular, it is difficult to determine the fabric of the clothing from the image, and thus, accurate input is required for each of the products.

Therefore, a technology for specifying the fabric of the clothing from the image of the clothing, is required. In addition, at this time, an arithmetic operation load for specifying the fabric, is required to be reduced as much as possible.

Means for Solving the Problems

An image processing device corresponding to one of embodiments of the present invention for solving the problems described above, includes:
an acquisition means for acquiring an image to be processed including an image of clothing, the image being configured of each component of a hue, saturation, and brightness;
a difference calculation means for calculating a difference between the image to be processed, and a plurality of shift images to be obtained by shifting the image to be processed in units of one pixel by at least one pixel or more in a prescribed direction, to generate a plurality of differential images corresponding to the number of shifted pixels;
a histogram generation means for generating a histogram of a differential pixel value with respect to each of the components of the hue, the saturation, and the brightness of the differential image; and
a determination means for determining a fabric of the clothing, on the basis of a feature of the histogram.

Effects of the Invention

According to the present invention, it is possible to provide a technology of specifying a fabric of clothing from an image of the clothing, without increasing an arithmetic operation load.

BRIEF DESCRIPTION OF THE DRAWINGS

FIG. 1 is a diagram illustrating a configuration example of an image processing device, corresponding to an embodiment of the present invention.

FIG. 2 is a flowchart illustrating an example of a flow of fabric determination processing, corresponding to the embodiment of the present invention.

FIG. 5 is a conceptual diagram for describing a determination table in the fabric determination processing, corresponding to the embodiment of the present invention.

FIG. 7 is a flowchart illustrating another example of the flow of the fabric determination processing, corresponding to the embodiment of the present invention.

PREFERRED MODE FOR CARRYING OUT THE INVENTION

Figure 3A:
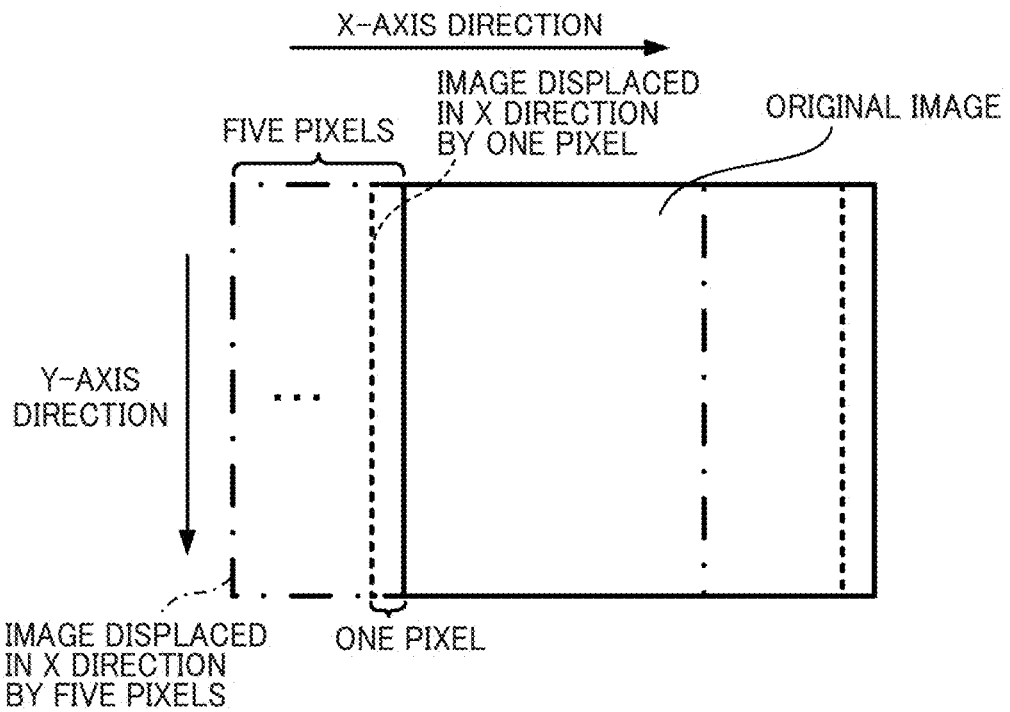
FIG. 3A is a conceptual diagram for describing the fabric determination processing, corresponding to the embodiment of the present invention.

Hereinafter, embodiments according to the present invention will be described with reference to the drawings. Furthermore, the embodiments described below are an example, and the present invention is not limited thereto. For this reason, other configurations may be included insofar as characteristic configurations of the present invention can be applied.

Embodiment 1

Hereinafter, a first embodiment of the present invention will be described with reference to the attached drawings. Here, constituents described in the embodiment are merely illustrative, and the scope of the present invention is not limited thereto.

<Configuration of Image Processing Device>

The outline of the image processing device corresponding to Embodiment 1, will be described. In Embodiment 1, a case of executing image processing corresponding to this embodiment in a single device, will be described.

The image processing device corresponding to Embodiment 1, for example, can be configured as a personal computer. In a case where the image processing device is configured as the personal computer, processing of analyzing an input image, and of determining a fabric of clothing included in the image, is executed. In addition, the image processing device may be configured as a device having an imaging function, and in this case, for example, can be configured as a digital camera, a digital video camera, a smart phone, and a tablet terminal. In addition, the image processing device may be configured as a laptop computer with a camera.

Hereinafter, an image processing device 10 corresponding to this embodiment will be described with reference to FIG. 1, and FIG. 1 illustrates an example in which the image processing device 10 is configured as a personal computer. Even though it is not illustrated in FIG. 1, in a case where the image processing device 10 is configured as a digital camera or the like, the image processing device 10 can be configured to have an imaging function for inputting an image, for example, to include an imaging sensor unit.

In FIG. 1, a CPU 100 performs control of executing an application program stored in a hard disk device (hereinafter, referred to as an HD) 105 (including an application program for executing the image processing corresponding to this embodiment), an operating system (OS), a control program, or the like, and of temporarily storing information, a file, or the like, necessary for executing the program, in a RAM 102. The CPU 100 controls data transmission and reception with respect to an external device through an interface 108, executes analysis processing of the data received from the external device, and generates data to be transmitted to the external device (including a processing request or a data request).

A ROM 101 stores various data items such as a basic I/O program, and the application program for executing the image processing corresponding to this embodiment. The RAM 102 temporarily stores various data items, and functions as a main memory, a work area, or the like of the CPU 100.

An external storage drive 103 is an external storage drive for realizing access with respect to a recording medium, and is capable of loading a program or the like stored in a medium (the recording medium) 104, in this computer system. Furthermore, for example, a Floppy (Registered Trademark) disk (FD), a CD-ROM, a CD-R, a CD-RW, a PC card, a DVD, Blu-ray (Registered Trademark), an IC memory card, an MO, a memory stick, and the like can be used as the medium 104.

In this embodiment, a hard disk (HD) functioning as a large-capacity memory, is used as the external storage device 105. In an HD 105, an application program, an OS, a control program, an associated program, and the like are stored. Furthermore, a non-volatile storage device such as a Flash (Registered Trademark) memory may be used instead of the hard disk.

An instruction input device 106 corresponds to a keyboard or a pointing device (a mouse or the like), a touch panel, and the like. An output device 107 outputs a command input from the instruction input device 106, response output of the image processing device 10 with respect to the command, and the like. The output device 107 includes a display, a speaker, a headphone terminal, and the like. A system bus 109 controls a flow of data in the image processing device.

An interface (hereinafter, referred to as an I/F) 108 functions as a transmission device, a reception device, or a communication device, which intermediates data exchange with respect to the external device. Specifically, the I/F 108 is capable of including a wireless communication module, and the module is capable of including a known circuit mechanism such as an antenna system, an RF transceiver, one or more amplifiers, a tuner, one or more oscillators, a digital signal processor, a CODEC chipset, a subscriber identification module card, and a memory. In addition, the I/F 108 is capable of including a wired communication module for wired connection. The wired communication module is capable of communicating with the other device through one or more external ports. In addition, the I/F 108 is capable of including various software components processing the data. The external port is directly combined with the other device, or is indirectly combined with the other device through the Ethernet, a USB, IEEE1394, or the like, or a network. Furthermore, software of realizing the same function as that of each of the devices described above, can be configured instead of a hardware device.

A database 110 is connected to the system bus 109, and stores and manages prescribed data under the control of the CPU 100. The prescribed data includes a processed image associated with a determination result of a fabric.

Whenever the corresponding program for executing the processing corresponding to the embodiment, is operated, the program may be loaded in the RAM 102 from the HD 105 in which the program is installed in advance. In addition, a program according to this embodiment, is recorded in the ROM 101, and is configured to form a part of a memory map, and thus, the program can be directly executed by the CPU 100. Further, the corresponding program or the associated data can be executed by being directly loaded in the RAM 102 from the medium 104.

<Fabric Determination Processing>

Next, an image processing method to be executed by the image processing device 10 corresponding to the embodiment, will be described. In the image processing method corresponding to this embodiment, processing of determining the fabric of the clothing (also referred to as a clothing fabric, a textile, or cloth) reflected on the image from an image to be processed, is performed. The fabric is specified on the basis of a combination between a material and weaving. More specifically, the fabric is generated by weaving a material such as cotton, wool, silk, polyester, nylon, and the other chemical fibers (for example, by plain weaving, twill, sateen weaving, or the like). Different fabrics are generated according to a material to be used in each weaving method.

The plain weaving is a weaving method of weaving a warp and a weft to intersect with each other while allowing the warp and the weft to alternately sink and float up and down one by one. A pattern of a folding line is bilaterally symmetric. For example, oxford or broadcloth to be used in a shirt, is generated by the plain weaving. Next, the twill is widely used as a weaving method of weaving a denim fabric, and is also used in gabardine, cotton flannel, serge, dungaree, tweed, and the like. The twill includes a method referred to as three-twill and a method referred to as four-twill. Both of the weaving methods are characterized in that a point where the warp floats, appears on a front surface of a textile, as an inclined line. The sateen weaving is a weaving method of weaving the warp and the weft by using five or more warps and wefts, and has beautiful glossiness since the warp and the weft are woven such that only one of the warp and the weft appears on the front surface, compared to the plain weaving or the twill in which the intersection between the warp and the weft appears on the clothing fabric to be seen, but is weak for friction. Thus, the weaving is configured by repeating a specific pattern, and thus, the pattern according to the weaving regularly appears on the front surface of the clothing fabric. Then, the pattern is changed according to the type of weaving, or a material to be used (the thickness of the material), that is, the fabric.

Next, the case of generating an image by photographing the clothing including such a fabric, will be considered. In general, in a case where an image is generated by photographing a subject, light (may be natural light or artificial illumination) applied to the clothing which is the subject, is reflected on the front surface of the clothing, the reflected light is incident on a lens of a photographing device, an image is formed on an imaging surface of an imaging element such as a CMOS sensor, and thus, an image of a subject image is generated.

Accordingly, the fact that the fabric used in the clothing is changed, corresponds to the fact that the state of the front surface of the subject on which incident light is reflected, is changed, and the fact that the fabric is different, is equivalent to the fact that a reflection condition of light is different. In addition, according to a generation principle of the image in the camera described above, a difference in the reflection condition is reflected on the image to be generated. Therefore, in this embodiment, a determination method of the fabric, based on an image feature for each fabric, is established by focusing on a difference in the reflection condition according to the fabric. By applying such a method, it is possible to specify the fabric of the clothing included in the image.

FIG. 2 is a flowchart of the processing corresponding to this embodiment. The processing corresponding to the flowchart, for example, can be realized by allowing the CPU 100 to execute the corresponding program (stored in the ROM 101, the HD 105, or the like), and to control an operation of each functional block.

First, in S201, the CPU 100 acquires the image to be processed. The image may be an image stored in the medium 104 or the HD 105, and in a case where the image processing device 10 includes the imaging sensor unit, an image generated by being photographed with the imaging sensor unit, may be input. In addition, the image is an RGB image configured of a pixel value of an RGB color space.

The resolution of the image acquired in S201 is not particularly limited. In addition, in a photographing condition of the image, it is not necessary that the image is an image photographed by a method in which the clothing fabric of the clothing is photographed close up, and thus, a woven texture is clearly observed. For example, in a state where a model wears the clothing, the image may be an image obtained by photographing the full body, the upper body, or the lower body to be in a field angle.

Subsequently, in S202, the CPU 100 extracts a region in which the fabric is determined, in the acquired image to be processed. The extraction of the region to be determined, for example, may be performed on the basis of the shape of the clothing, may be performed by specifying a clothing region on the basis of difference information with respect to a prescribed background, or may be performed by allowing a user of the image processing device 10 to designate the region to be determined. In this case, an outline of the entire clothing may be designated, or a part of a region of the clothing may be designated. A known technology such as a segmentation technology can be used in extraction processing itself of the region to be determined, and thus, the more detailed description will be omitted.

In addition, it is not necessary that the region to be processed is the entire cloth configuring the clothing, and the region to be processed may be a part of the cloth. In general, a prescribed clothing fabric is continuously used as the clothing, and thus, there is a case where specific woven pattern is regularly repeated, and therefore, only a part but not the entire can be a processing target.

Next, in S203, the CPU 100 converts the pixel value configuring the region to be determined, which is extracted in S202, from the RGB color space to a pixel value of an HSV color space. HSV is represented by a hue (H), saturation (S), and brightness (V). The conversion from RGB into HSV can be executed by a known conversion method.

Figure 4A:
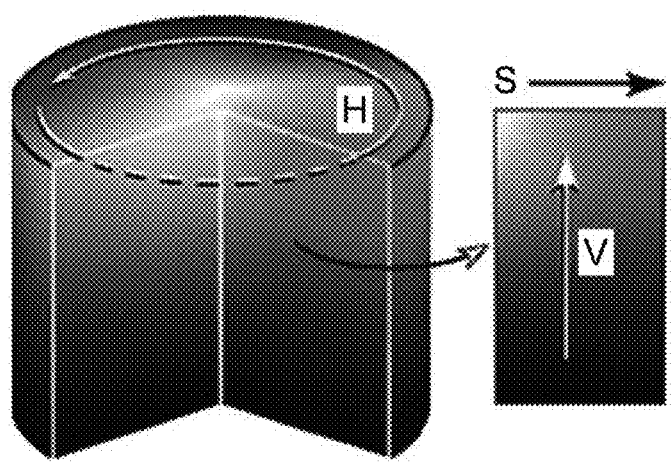
FIG. 4A is a diagram for describing the concept of a histogram, corresponding to the embodiment of the present invention.

FIG. 4A is a schematic view of an HSV space. The hue (H) described herein, indicates a difference in colors. In addition, the saturation (S) indicates the vividness of the color at the same hue (the amount of pure color), and the brightness (V) indicates the lightness of the color (the amount of black and white). The saturation (S) and the brightness (V) indicate the vividness or the tone at the same hue, and thus, in a case where a reflection pattern of light according to the weaving is continuously repeated at regular intervals, can be effectively used for detecting the reflection pattern.

Next, in S204, the CPU 100 calculates a difference in the pixel values between the images in a case where an HSV image converted into the HSV color space in S203, is displaced (shifted) in a prescribed direction by the prescribed number of pixels, with respect to each value of H, S, and V, generates a differential image, and generates a histogram of a pixel value (a differential pixel value or a difference value) of the differential image (a graph illustrating a frequency of each difference value in one image). In this embodiment, as an example, a case where displacement is performed in two directions of an X-axis direction (a horizontal direction), and a Y-axis direction (a vertical direction), as the prescribed direction, by one pixel, two pixels, three pixels, four pixels, and five pixels, has been described, but a displacement direction or the number of pixels is not limited to such a combination. For example, the displacement may be performed in an inclination direction. In addition, in the above description, a displacement amount is adjusted in units of one pixel, but the unit displacement amount may be the number of pixels greater than one pixel.

A generation method of the histogram will be described with reference to FIG. 3A and FIG. 3B. FIG. 3A illustrates a state where the pixel is displaced with respect to the X-axis direction (the horizontal direction) of the image. Here, a case where the displacement is performed by one pixel, and a case where the displacement is performed by five pixels, are represented for description. Furthermore, a ratio of the size of one pixel to the size of the image is large, but this is for description, and a ratio of the width of one pixel to the entire image may be smaller than that illustrated in the drawing. In addition, a case where the displacement is performed by two pixels, three pixels, and four pixels, is omitted, but in such a case, similarly, the displacement may be performed in the X-axis direction by the corresponding number of pixels.

Figure 3B:
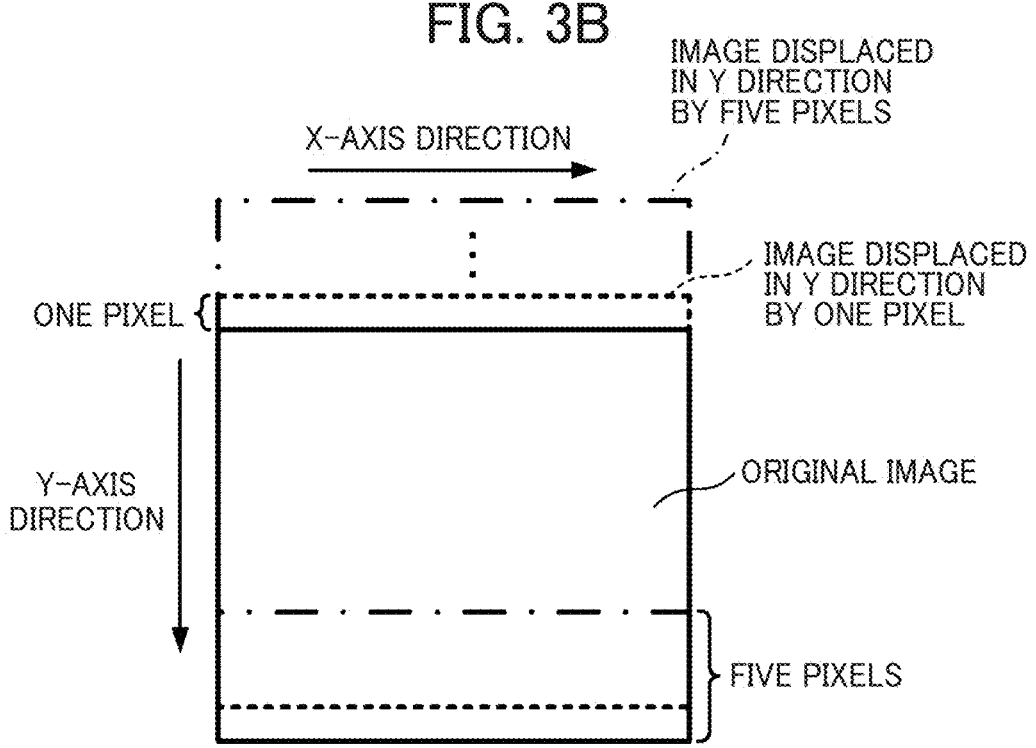
FIG. 3B is a conceptual diagram for describing the fabric determination processing, corresponding to the embodiment of the present invention.

FIG. 3B illustrates a state where the pixel is displaced in the Y-axis direction (the vertical direction) of the image. Here, a case where the displacement is performed by one pixel, and a case where the displacement is performed by five pixels, are also represented for description. A ratio of the size of one pixel to the size of the image is large, but similarly, this is for description, and a ratio of the width of one pixel to the entire image may be smaller than that illustrated in the drawing. In addition, a case where the displacement is performed by two pixels, three pixels, and four pixels, is omitted, but in such a case, similarly, the displacement may be performed in the Y-axis direction by the corresponding number of pixels.

In S204, in a case where the histogram is calculated, a difference in pixels positioned in the same pixel address between the original image, and a shift image after the original image is displaced by the prescribed number of pixels, is calculated with respect to each component of H, S, and V.

For example, $H_{n,m}$ represents a pixel value of the n-th H component on an X axis and the m-th H component on a Y axis, and similarly, $S_{n,m}$ and $V_{n,m}$ respectively represent pixel values of the S component and the V component in each position. At this time, initial values of n and m are respectively 1, and an original point position is an upper left side of the image.

In the calculation of the histogram, for example, a difference in saturation (S) component pixels in a case where one pixel to five pixels are displaced in the X-axis direction, can be obtained as follows. At this time, $S_{D-Xp(n,m)}$ represents a differential pixel value of the S component in a pixel address position (n, m) when the displacement is performed in the X-axis direction by p pixels. p is any one value of 1 to 5, the initial values of n and m are 1, and the maximum value corresponds to the maximum number of pixels of each row and column of the pixel. Each of the differential pixel values is calculated with respect to all of the values of n and m.

$$S_{D-X1(n,m)} = (S_{n,m} - S_{n+1,m})$$

$$S_{D-X2(n,m)} = (S_{n,m} - S_{n+2,m})$$

$$S_{D-X3(n,m)} = (S_{n,m} - S_{n+3,m})$$

$$S_{D-X4(n,m)} = (S_{n,m} - S_{n+4,m})$$

$$S_{D-X5(n,m)} = (S_{n,m} - S_{n+5,m})$$

Similarly, for example, a differential pixel value of the S component pixel in a case where one pixel to five pixels are displaced in the Y-axis direction, can be obtained as follows. At this time, $S_{D-Yp(n,m)}$ represents a differential pixel value of the S component in the pixel address position (n, m) when the displacement is performed in the Y-axis direction by p pixels. p is any one value of 1 to 5, the initial values of n and m are 1, and the maximum value corresponds to the maximum number of pixels of each row and column of the pixel. Each of the differential pixel values is calculated with respect to all of the values of n and m.

$$S_{D-Y1(n,m)} = (S_{n,m} - S_{n,m+1})$$

$$S_{D-Y2(n,m)} = (S_{n,m} - S_{n,m+2})$$

$$S_{D-Y3(n,m)} = (S_{n,m} - S_{n,m+3})$$

$$S_{D-Y4(n,m)} = (S_{n,m} - S_{n,m+4})$$

$$S_{D-Y5(n,m)} = (S_{n,m} - S_{n,m+5})$$

Figure 4B:
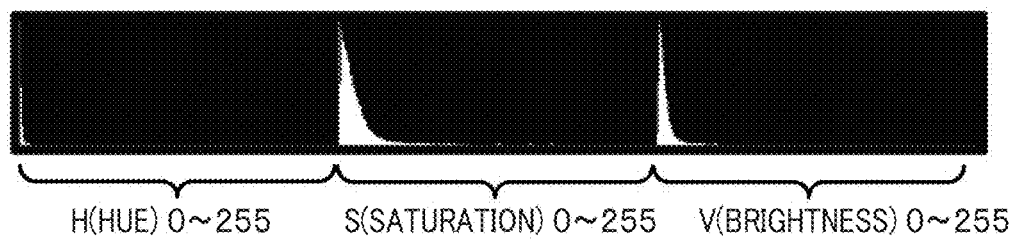
FIG. 4B is a diagram for describing the concept of the histogram, corresponding to the embodiment of the present invention.

In this embodiment, in a case where each pixel value is expressed by 8 bits (0 to 255), the differential pixel values $S_{D-Xp(n,m)}$ and $S_{D-Yp(n,m)}$ can be any one value of 0 to 255. In the histogram, an appearance frequency (a frequency) of the differential pixel values of 0 to 255 is obtained. Similarly, a histogram can be generated on the basis of a differential pixel value of each of the number of displaced pixels, with respect to a pixel value of each color component of H and V. An example of the histogram to be obtained at this time, is as illustrated in FIG. 4B. In FIG. 4B, a histogram obtained in a case where the displacement is performed in the X-axis direction by one pixel, is illustrated, and the same histogram is obtained according to a displacement amount of the pixel in each axis direction.

As described above, 10 histograms are generated with respect to one color component, a total of 30 histograms are generated along with H, S, and V. A horizontal axis indicates the differential pixel value, and as described above, is 0 to 255. A side close to the original point is 0. A vertical axis indicates the frequency of each of the differential pixel values. In this embodiment, the image is displaced by a small number of pixels of one pixel to five pixels, and thus, the differential pixel value is biased towards 0 side, but a difference occurs in the histogram by changing the number of pixels to be displaced. In addition, the thickness of the yarn is difference or the weaving method is different according to the fabric, and thus, a changing method of the histogram according to the displacement amount also includes a changing method corresponding to the properties of the fabric. In this embodiment, analysis is performed by a statistical method (for example, logistic regression analysis), and thus, a determination table is generated.

A conceptual diagram of the determination table is illustrated in FIG. 5. In FIG. 5, a classification result in a case where a skirt is a fabric determination target is illustrated. As described above, in each image, the histogram is generated with respect to each of the color components of HSV, and images having similar feature of the histogram are grouped. For example, in the case of wool, classification can be performed into two types of two wool (coarse) and wool (fine). In addition, in a case where several sub-groups are formed, as with cotton (plain) or denim, the sub-group may be allocated to independent classification, or all of the sub-groups can be classified together. For example, denim is sub-grouped into plain denim and patterned cloth having a difference in a color shade, but the plain denim and the patterned cloth are classified together, as the denim.

Thus, in this embodiment, the images having a similar or common feature amount based on the histogram are classified together as a group, and the corresponding fabric is associated with each group. Here, the feature amount based on the histogram to be associated with the fabric, for example, is capable of including the range of each of the components of HSV with respect to the fabric, a ratio of the frequency of each of the components of HSV in a case where the displacement amount is different, and a value obtained by an arbitrary method for defining the prescribed range with respect to the histogram. Then, in a case where a new histogram is obtained from a determination target image, it is determined to which classification the histogram belongs, on the basis of a feature amount obtained from the histogram, and thus, it is possible to specify the fabric of the clothing included in the determination target image.

In a case where the histogram is calculated as described above, subsequently, in S205, the CPU 100 compares the calculated histogram with the feature amount of the histogram allocated to each of the fabrics in the determination table, which is stored in the database 110. Then, the fabric of the clothing included in the image to be processed is determined on the basis of which feature amount corresponding to the fabric, the calculated histogram has.

Subsequently, in S206, in a case where the fabric of the clothing included in the image to be processed is known in advance with respect to a determination result obtained in S205, it is possible to verify the validness of the determination result by comparing the determination result with the actual fabric. The actual fabric may be associated with the image to be processed, which is input in advance, or may newly receive input at a determination timing of S206. The input can be performed by displaying a display corresponding to the determination result on a display of the output device 107, and by correcting a display result. In addition, in a case where the determination result is valid, the display contents of the display can be accepted.

In S206, the validness of the determination result is verified, and then, in S207, the CPU 100 updates the contents of the determination table in the database 110, on the basis of a verification result of the validness. For example, in S205, in a case where it is determined as wool, but actually, it is cotton, the contents of the determination table can be corrected such that a set of histograms obtained in S204 are classified into cotton.

Furthermore, the processing of S206 and S207 may be omitted according to the embodiment. For example, in a case where the user determines the fabric of the clothing which is photographed by using a smart phone, such steps may be omitted.

As described above, in this embodiment, it is possible to provide an image processing method of specifying the fabric of the clothing included in the image, on the basis of the histogram of a difference in the images of each of the color components of H, S, and V obtained from the image to be processed. In the processing method, a difference in the images is calculated by displacing the image in the prescribed direction, in the prescribed pixel unit, and the determination is performed on the basis of the appearance frequency of the differential pixel value, and thus, an arithmetic operation having a high load, such as pattern matching processing after enlarging the image, is not necessary.

In addition, cumbersome preparation or the like for processing is not necessary, from the viewpoint that the determination can be performed by using an image obtained by photographing a state where a person wears clothing, without generating a special image for determination, and, convenience is excellent since it is not necessary to prepare a dedicated device. Accordingly, for example, the image processing method corresponding to this embodiment is executed with respect to an image obtained by photographing the clothing with a mobile terminal with a camera function (a smart phone) or a digital camera, by using the device, and thus, it is possible to specify the fabric of the clothing.

In addition, the information of the determination table necessary for the processing corresponding to this embodiment, is information relevant to a prescribed histogram range for specifying the fabric, and thus, an enormous data amount is not necessary. Accordingly, even in a case where the present invention is performed by a user terminal having a limitation in storage capacity, it is possible to reduce a burden on the storage capacity by retaining the determination table.

Embodiment 2

In Embodiment 1 described above, a case has been described in which the image processing method of specifying the fabric of the clothing included in the image to be processed, is performed by a single device. In contrast, in this embodiment, a case will be described in which a server specifies a fabric of clothing included in an image generated by a client in a client-server system, and notifies the result thereof is notified to the client. In particular, a system including a server managing an online shopping site, will be described.

It is general that information relevant to a fabric, registered along with product registration with respect to the online shopping site, but the input may be omitted. In addition, in a case where products of the same type and a plurality of different fabrics, are provided, there is a case where even though an image corresponding to each of the fabrics is provided, the fabric itself is not associated with the image. Further, draping is different according to a weaving method even in the same material, but for example, there is a case where wool, wool is simply input regardless of a difference in the weaving method. Further, in a case where a determination standard of fabric classification is different according to a registrant, there is a concern that a variation occurs in the classification, in the online shopping site. In such a case, even though the user searches a product on the basis of the fabric, it is not possible to smoothly find out the product that the user wants, and the user accesses a plurality of pages or searches the product a plurality of times, until the user finds out the product, and as a result thereof, a traffic increases, and a load on the server of the online shopping site increases.

Therefore, in this embodiment, when the product is registered in the online shopping site, fabric determination processing of this embodiment is executed, and thus, the fabric can be determined by a unified image processing method, at the time of the product registration, and can be registered in the server, in association with the image. Accordingly, it is possible to provide a unified classification of the fabrics by excluding a case where there is a difference in the presence or absence of the information of the fabric for each product, or a case where there is a variation in the classification due to a difference in the determination standard according to each of the registrants. Accordingly, it is possible to prevent confusion due to a variation in fabric display when the user searches the product.

<System Configuration>

Figure 6A:
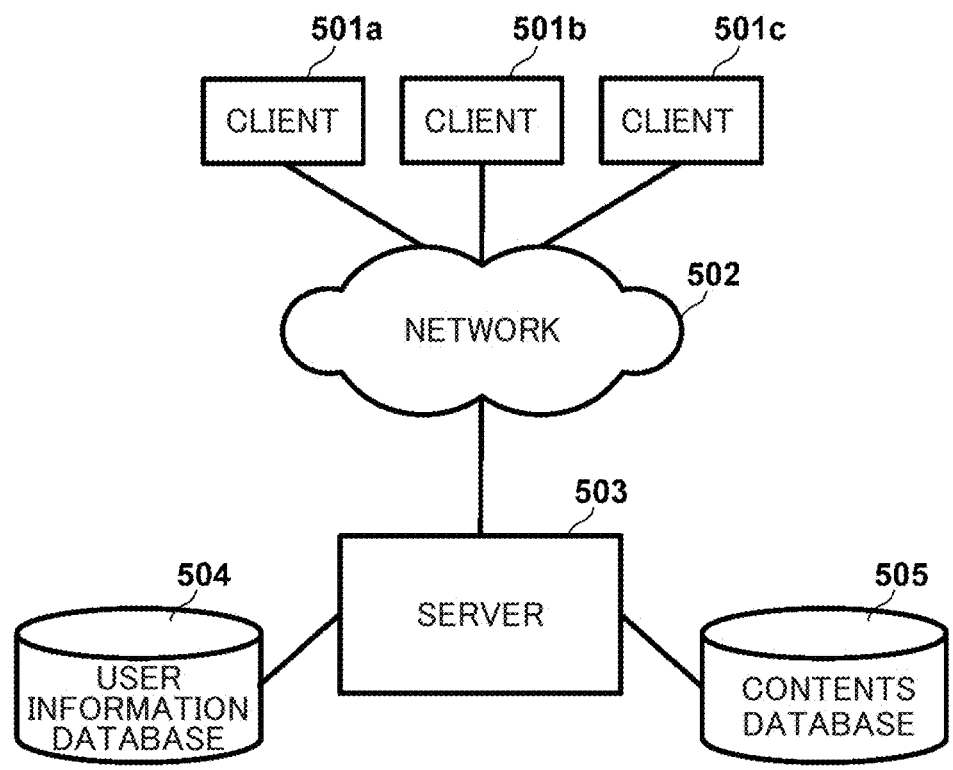
FIG. 6A is a diagram illustrating a configuration example of the entire client-server system, corresponding to the embodiment of the present invention.

Hereinafter, the configuration of the client-server system corresponding to this embodiment will be described. FIG. 6A is a block diagram illustrating an example of the configuration of the entire system corresponding to this embodiment, in a case where the systems is constructed as the online shopping site. The system is configured by connecting the user terminal and the server to a network. The server manages the online shopping site, and manages each user information item of a store and a customer, in addition to image information of a product to be sold in the site.

Clients 501a, 501b, and 501c (hereinafter, collectively referred to as a "client 501") are a user terminal which is operated by the user, and receives user authentication by the server, and then, is capable of receiving a service provided from the server. In this embodiment, the service is largely set to a branch store of the store in the online shopping site, and more specifically, includes a specific service of a fabric relevant to a clothing image at the time of registering the product to be sold in the store.

A server 503 is a device which authenticates the user of the client 501, and provides the service with respect to the client 501 used by the authenticated user. The client 501 and the server 503 are respectively connected to a network 502, and are capable of communicating with each other. For example, the network 502 can be constructed as the Internet, a local area network (LAN), or a wide area network (WAN). The Internet is a network in which networks in the world are connected to each other, but the network 502 may be a network in which networks only in a specific organization can be connected to each other, such as an intranet. A user information database 504 and a contents database 505 are connected to the server 503.

The client 501 is operated by the user, and thus, is capable of using the service provided by the server 503. As described above, the service includes providing image processing of specifying the fabric of the clothing included in the photographed image. The client 501 is a user terminal, an information processing device, or a communication device, for example, includes a laptop computer, a desktop computer, a personal digital assistance, a mobile phone, a smart phone, a tablet terminal, and the like. The client 501 is provided with a camera for generating an image by photographing a subject. The client 501 is connected to the network 502 by wireless data communication means such as a wireless LAN and LTE. Furthermore, the client 501 may be configured such that access to the network 502 can be performed by a LAN including a network cable such as the Ethernet (Registered Trademark).

The server 503 manages the user information database 504, retains registration information of each user of the client 501, and in a case where each of the users receives the service, it is possible to determine whether or not the user has authority for receiving the service. In addition, the server 503 may manage data stored in the contents database 505, and may update the data on the basis of the information transmitted from the client 501. The server 503, for example, is connected to the user information database 504 or the contents database 505 through the LAN. The user information database 504 and the contents database 505 are respectively an information processing device in which prescribed database software is installed, and manage various data items.

The user information database 504 manages the registration information of each of the users. Specifically, the user information database 504 stores a user identifier for uniquely identifying the user (a user ID), user registration information for determining whether or not the user is a registered user (for example, setting a user name and a password, or the like), and the like, in association with each other.

The contents database 505 manages contents data provided to the client 501 from the server 503. In addition, the contents database 505 stores and manages the contents uploaded by the client 501. The contents data includes data such as a text, an image, a moving image, and a sound. Here, the image also includes an image in which the fabric is determined by the fabric determination processing corresponding to this embodiment. In the image, the information of the fabric is stored by being associated with the image. In the contents data, a contents ID for uniquely identifying the contents data is allocated.

Furthermore, herein, for the sake of convenience, it has been described that the server 503, the user information database 504, and the contents database 505 are respectively realized by a physically independent information processing device, but the embodiments of the present invention are not limited thereto. For example, the server 503, the user information database 504, and the contents database 505 may be realized by a single information processing device. On the other hand, each of the devices such as the server 503 may has a redundant configuration or a dispersion configuration by a plurality of information processing devices. In addition, it has been described that the user information database 504 is connected to the server 503 through the LAN or the like, and for example, may be configured to communicate with the server 503 through the network 502 or an intranet (not illustrated). The same applies to a relationship between the server 503 and the contents database 505. In addition, the user information managed by the user information database 504, and contents associated data managed by the contents database 505 may be integrally managed.

Figure 6B:
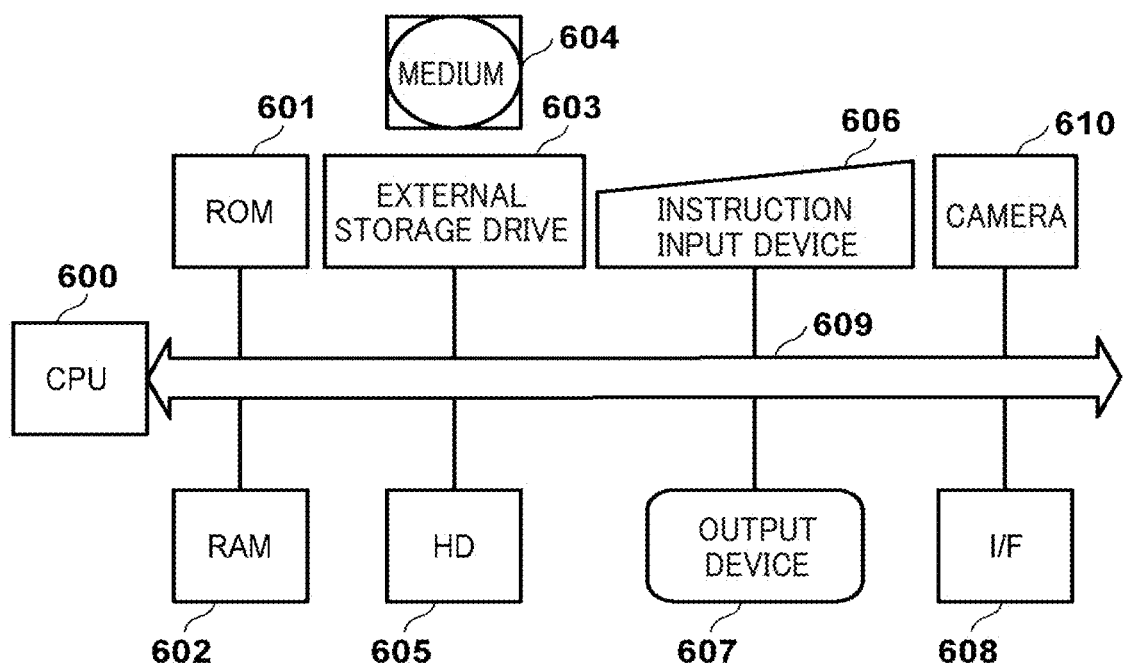
FIG. 6B is a block diagram illustrating an example of a hardware configuration of a client 501, corresponding to the embodiment of the present invention.

FIG. 6B is a block diagram illustrating an example of a hardware configuration of the client 501. The user information database 504 and the contents database 505 as the information processing device described above, may be configured as a similar or equivalent hardware configuration. Functions and applications, and relationships of a CPU 600, a ROM 601, a RAM 602, an external storage drive 603, a medium 604, an HD 605, an instruction input device 606, an output device 607, an I/F 608, and a system bus 609 are similar or equivalent to those described with respect to the constituents with the same names by using FIG. 1.

Here, in this embodiment, the client 501 further includes a camera 610, in addition to the configuration of FIG. 1. The camera 610 is capable of including a photographing optical system, an imaging element (a CMOS sensor or the like), an A/D conversion unit, and the like. An image signal output from the camera 610, may be stored in the RAM 602, and for example, may be converted into a JPEG image according to compression and encoding processing of the CPU 600, and may be stored in the medium 604 or the HD 605.

A hardware configuration of the server 503 is identical to that illustrated in FIG. 1, and thus, here, the description thereof will be omitted. Furthermore, the database 110 corresponds to the user information database 504 and the contents database 505.

<Fabric Determination Processing in System>

Hereinafter, in the client-server system illustrated in FIG. 6A, the operation of each of the devices in a case where the fabric determination processing is executed, will be described in detail.

In a case where the client 501 requests the registration of a product to be sent to the store, to the server 503, a webpage for registering a product image is transmitted from the server 503, as a flow of general processing corresponding to this embodiment. The webpage received by the client 501, is displayed on the display of the output device 507. The user of the client 501 photographs a picture of clothing to be subjected to the product registration, according to an instruction of the displayed webpage, transmits the picture to the server 503, and acquires fabric information, as a result of the determination processing executed on the server 503 side. The photographed image of the clothing and the fabric information can be uploaded to the server 503, in association with each other.

FIG. 7 illustrates an example of a flowchart of the processing to be executed between the client 501 and the server 503. The processing corresponding to the flowchart, for example, can be realized by allowing each of the CPUs of the client 501 and the server 503 to execute the corresponding program, and to control the operation of each of the functional blocks.

First, in S701, the CPU 600 of the client 501 transmits a product registration request according to the operation from the user through the instruction input device 606, to the server 503 through the interface 608. In S702, the CPU 100 of the server 503 detects that the product registration request transmitted from the client 501 is received. Subsequently, in S703, the CPU 100 on the server 503 side controls the interface 108, and transmits the information of the webpage for registering an image, to the client 501. The webpage includes information for uploading the photographed picture to the server.

In S704, in a case where the client 501 receives the webpage for registering an image, through the interface 608, the CPU 600 displays the webpage on the display of the output device 607. Subsequently, in S705, in the client 501, a subject (for example, the clothing worn by the model) is photographed by the camera 610, according to the operation from the user through the instruction input device 606, and thus, an image is generated.

In S706, the CPU 600 displays the image photographed in S705, on the display, receives the designation of the region to be determined of the fabric from the user, through the instruction input device 606, and extracts the designated region from the photographed image. For example, in a case where target clothing that the user wants to determine the fabric, is a skirt, it is possible to receive input for designating the outline of the skirt or a part of the skirt. Subsequently, in S707, the CPU 600 transmits the image of the region extracted in S706, to the server 503 through the interface 608. Furthermore, in the image transmission of S706, not only the image of the region but also the entire image generated in S703 may be transmitted to the server 503. In this case, information for designating the region can be transmitted by being attached to the transmitted image.

In S708, the CPU 100 of the server 503 receives the image transmitted by the client 501 in S707, through the interface 108. Subsequently, in S709, the CPU 100 executes the fabric determination processing with respect to the received image. In S709, the CPU 100 executes the processing corresponding to S203 to S205 of FIG. 2. When it is possible to specify the fabric of the clothing included in the received image, in S710, the CPU 100 transmits a fabric determination result to the client 501, through the interface 108.

In S711, the CPU 600 of the client 501 receives the fabric determination result transmitted by the server 503 in S710, through the interface 608. Subsequently, in S712, the CPU 600 controls the interface 608, and uploads the fabric determination result received in S711 to the server 503 by associating the fabric determination result with the image photographed in S705. In S713, the CPU 100 of the server 503 receives the image uploaded from the client 501 in S712, through the interface 108, and registers the image in the contents database 505.

Furthermore, in S706, in a case where the entire image is transmitted in advance, in the processing of S712, the image is not transmitted, but an image registration request based on the transmitted fabric determination result, can be transmitted. In this case, both of the image which is a registration target and the fabric determination result are on the server 503 side, and thus, only a request for performing registration in associated with each other, may be transmitted, on the client 501 side.

As described above, in a case where the image photographed by the client 501, is registered in the server 503, the registration can be performed by specifying in advance the information of the fabric, and then, by associating the information with the image. Accordingly, when the product image is registered in the online shopping site, the registration can be performed after the fabric is specified. At this time, it is possible to specify the fabric by only the image without confirming the product itself, and thus, it is possible to complete the processing by only the image at the time of registering a volume of clothing in the site, and to reduce a burden on the user. In addition, an arithmetic operation load is low in the fabric determination processing corresponding to this embodiment, and thus, even in a case where the determination is performed on the server 503 side, a processing load on the server side does not increase.

OTHER EMBODIMENTS

The present invention is not limited to the embodiments described above, and various modifications and variations can be performed without departing from the spirit and scope of the present invention. Accordingly, in order to publicize the scope of the present invention, the following claims are attached. In addition, the information processing device according to the present invention, can be realized by a computer program for allowing one or more computers to function as the information processing device. The computer program can be provided/distributed by being recorded in a computer-readable recording medium, or through an electrical communication line.

The invention claimed is:

1. An image processing device, comprising:
    at least one memory configured to store computer program code;
    at least one processor configured to read said computer program code and operate as instructed by said computer program code, said computer program code including:
    acquisition code configured to cause at least one of said at least one processor to acquire an image to be processed including an image of clothing, the image being configured of each component of a hue, saturation, and brightness;
    difference calculation code configured to cause at least one of said at least one processor to calculate a difference between the image to be processed, and a plurality of shift images to be obtained by shifting the image to be processed in units of one pixel by at least one pixel or more in a prescribed direction, to generate a plurality of differential images corresponding to the number of shifted pixels;
    histogram generation code configured to cause at least one of said at least one processor to generate a histogram of a differential pixel value with respect to each of the components of the hue, the saturation, and the brightness of the differential image; and
    determination code configured to cause at least one of said at least one processor to determine a fabric of the clothing, on the basis of a feature of the histogram.

2. The image processing device according to claim 1, wherein the prescribed direction is a horizontal direction and a vertical direction in the image to be processed.

3. The image processing device according to claim 1, wherein the determination code is configured to cause at least one of said at least one processor to specify a fabric which is associated with the histogram generated, with reference to a table in which a prescribed fabric is associated with a feature of a histogram to be obtained from an image of the prescribed fabric.

4. The image processing device according to claim 1, further comprising:
    extraction code configured to cause at least one of said at least one processor to extract an image of region in which the differential image is generated, from the image to be processed,
    wherein the difference calculation code is configured to cause at least one of said at least one processor to generate the plurality of differential images with respect to the extracted image of the region.

5. The image processing device according to claim 1, wherein the difference calculation code configured to cause at least one of said at least one processor to generate the plurality of differential images by shifting one pixel to five pixels in units of one pixel, in the prescribed direction.

6. The image processing device according to claim 1, further comprising conversion code configured to cause at least one of said at least one processor to convert an RGB color space image into an HSV color space image.

7. The image processing device according to claim 1, further comprising:
a photographing device that photographs the clothing to generate the image to be processed.

8. The image processing device according to claim 1, further comprising:
communication interface that receives the image to be processed from an external device.

9. The image processing device according to claim 8, wherein the communication interface transmits a determination result of the fabric of the clothing, to the external device.

10. A server managing product information in an online store, the server comprising:
reception code configured to cause at least one of said at least one processor to receive an image to be processed including an image of clothing from a client, in a case where a product registration request of the clothing is received from the client performing product registration in the online store, the image being configured of each component of a hue, saturation, and brightness;
difference calculation code configured to cause at least one of said at least one processor to calculate a difference between the image to be processed, and a plurality of shift images to be obtained by shifting the image to be processed in units of one pixel by at least one pixel or more in a prescribed direction, to generate a plurality of differential images corresponding to the number of shifted pixels;
histogram generation code configured to cause at least one of said at least one processor to generate a histogram of a differential pixel value with respect to each of the components of the hue, the saturation, and the brightness of the differential image;
determination code configured to cause at least one of said at least one processor to determine a fabric of the clothing, on the basis of a feature of the histogram; and
notification code configured to cause at least one of said at least one processor to notify a determination result to the client.

11. The server according to claim 10, further comprising acquiring code configured to cause at least one of said at least one processor to acquire designation of a region in which the differential image is generated, and
wherein the difference calculation code is configured to cause at least one of said at least one processor to generate the plurality of differential images with respect to an image of the designated region, in the image to be processed.

12. The server according to claim 10, further comprising:
registration code configured to cause at least one of said at least one processor to register the image to be processed and the determination result in association with each other, in a database, in a case where a registration request of the image to be processed, based on the notified determination result, is received from the client.

13. An image processing method, comprising:
acquiring an image to be processed including an image of clothing, the image being configured of each component of a hue, saturation, and brightness;
calculating a difference between the image to be processed, and a plurality of shift images to be obtained by shifting the image to be processed in units of one pixel by at least one pixel or more in a prescribed direction, to generate a plurality of differential images corresponding to the number of shifted pixels;
generating a histogram of a differential pixel value with respect to each of the components of the hue, the saturation, and the brightness of the differential image; and
determining a fabric of the clothing, on the basis of a feature of the histogram.

14. A non-transitory computer readable medium storing the computer program code according to claim 1.

* * * * *